United States Patent [19]
Suzuki et al.

[11] Patent Number: 5,886,340
[45] Date of Patent: Mar. 23, 1999

[54] MULTIPLE STEP AUTOMATIC FOCUSING APPARATUS FOR A SURVEYING INSTRUMENT

[75] Inventors: Shinichi Suzuki; Masahiro Nakata, both of Tokyo, Japan

[73] Assignee: Asahi Kogaku Kogyo Kabushiki Kaisha, Tokyo, Japan

[21] Appl. No.: 819,139

[22] Filed: Mar. 17, 1997

[30] Foreign Application Priority Data

Mar. 15, 1996 [JP] Japan ..................................... 8-059830

[51] Int. Cl.⁶ ........................................................ G01J 1/20
[52] U.S. Cl. ..................................... 250/201.7; 250/559.3; 356/11
[58] Field of Search .............................. 250/201.2, 201.4, 250/201.7, 559.3, 559.38; 356/11, 4.04; 396/79, 80, 94, 111, 121

[56] References Cited

U.S. PATENT DOCUMENTS

| | | | |
|---|---|---|---|
| 4,394,569 | 7/1983 | Nakamura | 250/204 |
| 4,485,303 | 11/1984 | Suzuki | 250/201.2 |
| 4,491,402 | 1/1985 | Suzuki | 250/204 |
| 5,483,318 | 1/1996 | Hamada et al. | 396/121 |
| 5,530,514 | 6/1996 | Lisson et al. | 396/128 |
| 5,664,236 | 9/1997 | Utagawa | 396/128 |

FOREIGN PATENT DOCUMENTS 7159160  6/1995  Japan .

*Primary Examiner*—Que T. Le
*Attorney, Agent, or Firm*—Greenblum & Bernstein, P.L.C.

[57] ABSTRACT

An automatic focusing apparatus includes a telephotographic system and a line sensor comprising multiple light receiving devices which receive light of an object image formed by the telephotographic system, multiple monitor sensors positioned adjacent to said line sensor, which monitor a quantity of light received by the line sensor, and a focus detecting device which controls a light receiving time of the light receiving devices in accordance with the monitor sensors, and detects a focusing state based on outputs of respective light receiving devices. When the focus detecting device fails to detect an effective focusing state, the light receiving time of the line sensor is controlled only by the monitor sensor positioned at a center.

17 Claims, 15 Drawing Sheets

MULTIPLE STEP AUTOMATIC FOCUSING APPARATUS FOR A SURVEYING INSTRUMENT

BACKGROUND OF THE INVENTION

1. Field of the Invention

The present invention relates to an automatic focusing apparatus which can be applied to an auto-level, a theodolite or a transit instrument etc., having a telephotographic system.

2. Description of the Related Art

A surveying instrument, such as an auto-level, a theodolite or a transit instrument etc., is basically provided with a collimating telescope, a level, and scales for measuring a rotative angle or an elevational angle. The surveying instrument is set in a horizontal plane and is adjusted in horizontal and vertical directions so that an operator may observe a collimation point or object through a collimating telescope.

A typical surveying instrument having a collimating telescope is provided, in an order from an object side, with an objective lens, a focusing lens and an eyepiece. The position of the focusing lens is adjusted according to the distance from the object, so that an image of the object may be formed on a focusing plate (reticle). The operator may thus observe the image superimposed on the reticle via the eyepiece.

For example, provided that the scope range of the object distance is between 1 m—infinity (this range is very wide compared with a telescope or binoculars), and that the focusing lens is a concave lens, the approximate amount of movement of the focusing lens is 30 mm. The focusing lens is normally driven through an operation of a rotative knob. If the amount of movement of the object image, namely the amount of movement of the focusing lens, is set smaller in regard to the rotative angle of the rotative knob, the amount of movement of the object image becomes smaller as compared with the rotative angle. Therefore, a relatively large amount of time is required to move such a lens. On the other hand, if the amount of movement of the object image is set larger in regard to the rotative angle of the rotative knob, the amount of movement of the object image becomes great compared with the rotative angle. Such an arrangement leads to difficulty in stopping the object image on the reticle.

Additionally, if the object is positioned far in the distance, the object image moves a large amount forwardly and rearwardly through a small operation of the rotative knob in the rotative direction. On the other hand, if the object is positioned relatively close to the focusing lens, the amount of movement of the object image becomes smaller as compared with the amount of rotation of the rotative knob, thus it is required to move the rotative knob a great deal for the purpose of moving the object image on the reticle. In such a case, it is difficult to determine whether the aiming object is in a front focus or a rear focus position, which may lead the operator to rotate the rotative knob in the wrong direction opposite to the focus direction. In any event, a conventional auto-level suffers from the fact that it takes too much time for focusing.

In order to overcome the above mentioned problem, a survey instrument is provided in which a so-called passive type of automatic focusing apparatus is mounted. As is well known, the focusing of the automatic focusing apparatus is performed, firstly by dividing an optical path of the optical system of the collimating telescope, and secondly by detecting a defocus along the divided optical path, based on the object image focused at the same position as that of the focusing plate.

However, the survey instrument normally utilizes a staff which serves as the aiming object, so that the staff is positioned at the center of the visual field (on the vertical line of the reticle). The size of the staff image in the visual field becomes smaller especially as the distance becomes longer. Consequently, the conventional auto-level may focus on the background of the staff in the case of high contrast, namely when the staff is dark while the background behind the staff is brighter.

SUMMARY OF THE INVENTION

It is an object of the present invention to provide an automatic focusing apparatus for a surveying instrument, in which the focusing operation can be accurately carried out, regardless of the size, brightness or contrast of a main object positioned at the center of the visual field.

To achieve the object mentioned above, according to the present invention, there is provided an automatic focusing apparatus which includes a telephotographic system and a line sensor comprising multiple light receiving elements which receive light of an object image formed by the telephotographic system, multiple monitor sensors, positioned adjacent to the line sensor, which monitors quantity of light received by the line sensor, a focus detecting device which controls light receiving time of the light receiving devices by all of the monitor sensors, and detects a focusing state based on outputs of respective light receiving elements. When the focus detecting device detects no effective focusing state, the light receiving time of the line sensor is controlled only by the monitor sensor positioned at the center.

The line sensor receives light of an object image in a portion corresponding to a focus detecting portion symmetrically extending from a center of a visual field of the telephotographic system, and the monitor sensor, positioned at the center monitors the quantity of light in a portion symmetrically extending from the center of the visual field.

The focus detecting device detects a focusing state based on the output from the light receiving devices corresponding to a center portion symmetrically extending from the center of the visual field when the focus detecting device controls the light receiving time of the line sensor using the monitor sensor positioned in the center.

The line sensor further comprises a pair of line sensors which each receive luminous flux from a beam-splitting device, and the focus detecting device detects a defocus amount based on the phase difference between the light received by the pair of line sensors.

The focus detecting device calculates the contrast of an object image in the center portion, of which light is received based on the output of the line sensor, where the monitor sensors control the light receiving time of the pair of line sensors.

The focus detecting device controls the light receiving time of the line sensor using the monitor sensor in the center when the calculated contrast is less than a predetermined value.

The automatic focusing apparatus for a telephotographic system further comprises an objective lens group, a focusing lens group, a focusing plate having a reticle, an eyepiece lens group to observe an object image formed on the focusing plate, and a beam splitter optical system positioned between the focusing lens group and the focusing plate, where the line sensor which comprises a plurality of light receiving devices positioned horizontally along a light path split by the beam splitter optical system by designating the reticle as the center. The focus detecting device detects the focusing state based on the output from the light receiving devices involved in a focal detection portion where the reticle is designated as the center.

The telephotographic system further comprises a focusing lens group driving device which drives the focusing lens group based on the focusing state detected by the focus detecting device.

The present disclosure relates to subject matter contained in Japanese Patent Application No. 08-59830 (filed on Mar. 15, 1996) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENTS

Figure 1:
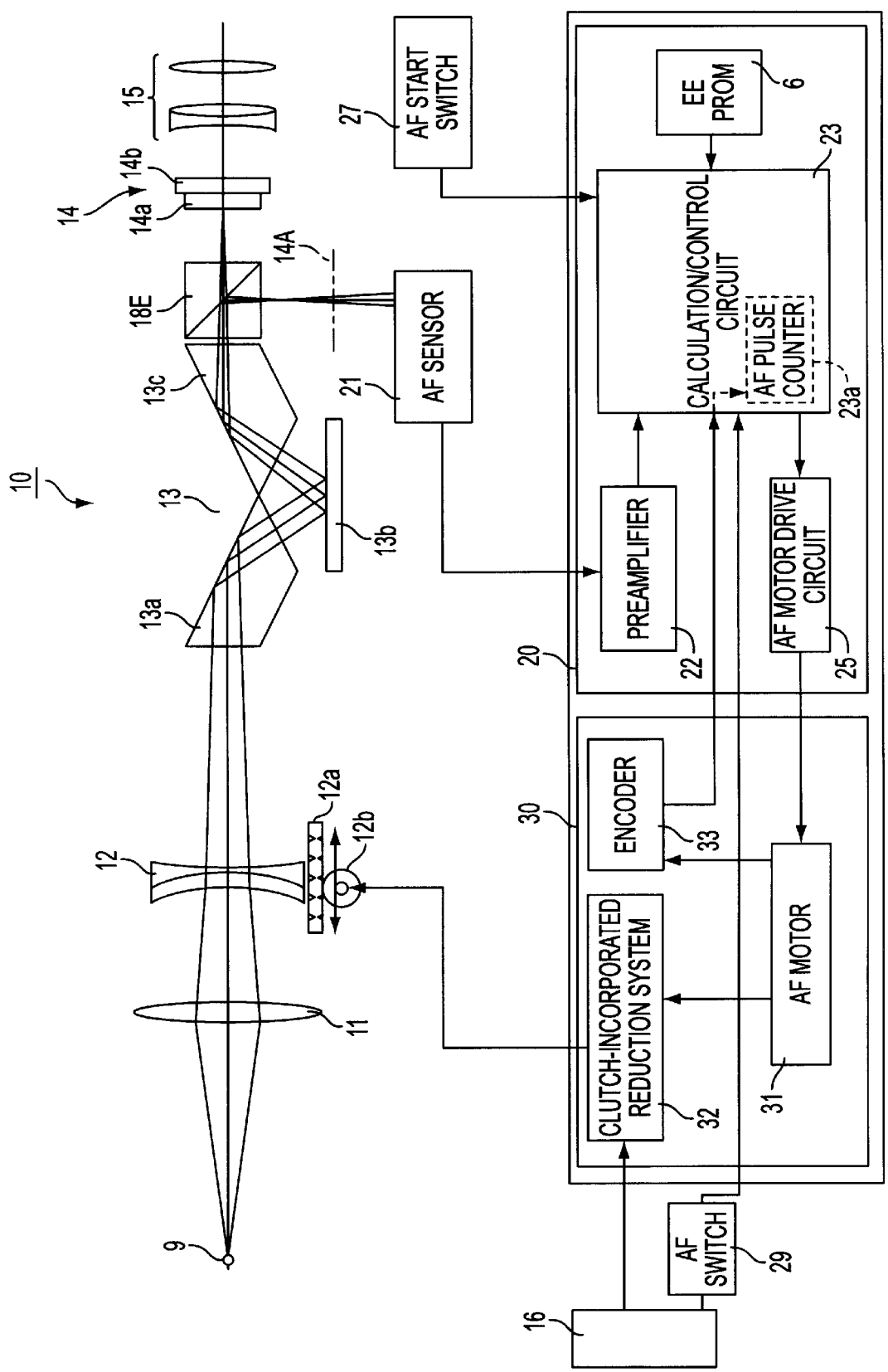
FIG. 1 is a block diagram of components and elements of an embodiment of an auto-level to which the present invention is applied.

FIG. 1 shows an automatic focusing apparatus according to an embodiment of the present invention. An auto-level 10 consists of a collimating objective lens group 11 of positive power, a focusing lens group 12 of negative power, an optical horizontal compensation system 13, a focusing plate (which defines a focal plane) 14, and a positive eyepiece 15, in this order from an object side (left side of FIG. 1).

The optical horizontal compensation system 13, per se known, consists of a first compensation prism 13a, a compensation mirror 13b, and a second compensation prism 13c, and has a symmetrical shape. The optical horizontal compensation system 13 is hung from a shaft by a string (not shown). The angle defined between the compensation mirror 13b and the first compensation prism 13a is identical (in absolute-value) to the angle defined between the compensation mirror 13b and the second compensation prism 13c, but are opposite in direction. The angle, for example 30°, varies depending on the length of the string, etc. from which the optical horizontal compensation system is suspended. When the optical horizontal compensation system 13 is set so that the optical axes of the objective lens group 11 and the focusing lens group 12 are substantially parallel (inclined at, for example, about 10 to 15 minutes with respect to the horizontal axis), light incident upon the first compensation prism 13a is deviated from the horizontal direction by the same amount. However, the light reflected by and emitted from the first compensation prism 13a, the compensation mirror 13b and the second compensation mirror 13c, is substantially collimated.

The focusing lens group 12 is provided, as a lens moving device, with a rack 12a secured thereto, which is engaged by a pinion 12b. When a rotation of the pinion 12b takes place to move the focusing lens group 12 in the optical axis direction, the image of an object (surveying staff) 9 formed by the objective lens group 11 and the focusing lens group 12 is translated along the optical axis. The operator views the object image formed on the focusing plate 14 together with the reticle etc., drawn on the focusing plate 14, through the eyepiece 15.

A beam splitter (half mirror) 18E is provided in the light path between the objective lens group 11 and the focusing plate 14 to split the light (or light path). A focus detecting system (focus detector) 20 is provided in the split light path to detect the focus state (state of the formed image) at a surface 14A optically equivalent to the focusing plate 14. The focusing lens 12 is driven by a lens driver 30 in accordance with the output of the focus detector 20.

Figure 2:
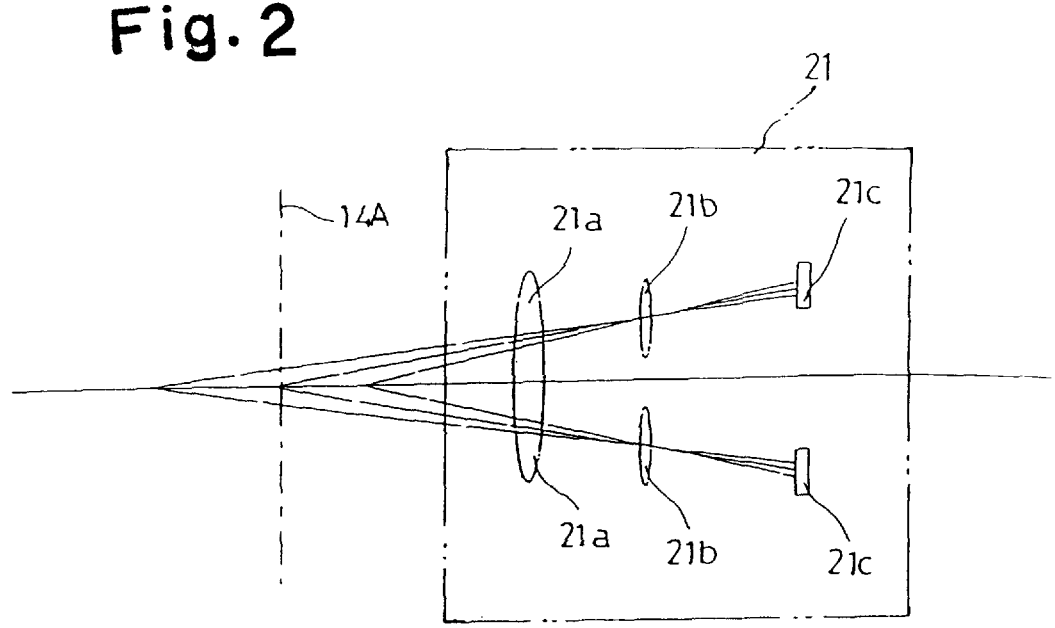
FIG. 2 is a schematic plan view of an embodiment of an AF sensor of an auto-level according to the present invention.

The focus detector 20 includes an AF sensor 21 located in the vicinity of the equivalent surface 14A, so that the defocus amount can be detected in accordance with the output of the AF sensor 21. In the illustrated embodiment in FIG. 2, a phase difference type AF sensor 21 is used in which the object image on the equivalent surface 14A is split by a condenser lens (21a) and a pair of separator lenses (image forming lenses) 21b spaced at a distance identical to the base length, and is re-formed on a pair of CCD line sensors 21c. The position of the object image incident upon the pair of CCD line sensors 21c varies according to the focus of the object, namely, the position when the image of the object 9 is accurately formed on the equivalent surface 14A (focused), when formed in front of the equivalent surface 14A (front focus), or when formed beyond the equivalent surface 14A (rear focus). The amount of deviation from the focus (defocus amount) can be judged from the position of an object image formed on the pair of CCD line sensors 21c.

Figure 3:
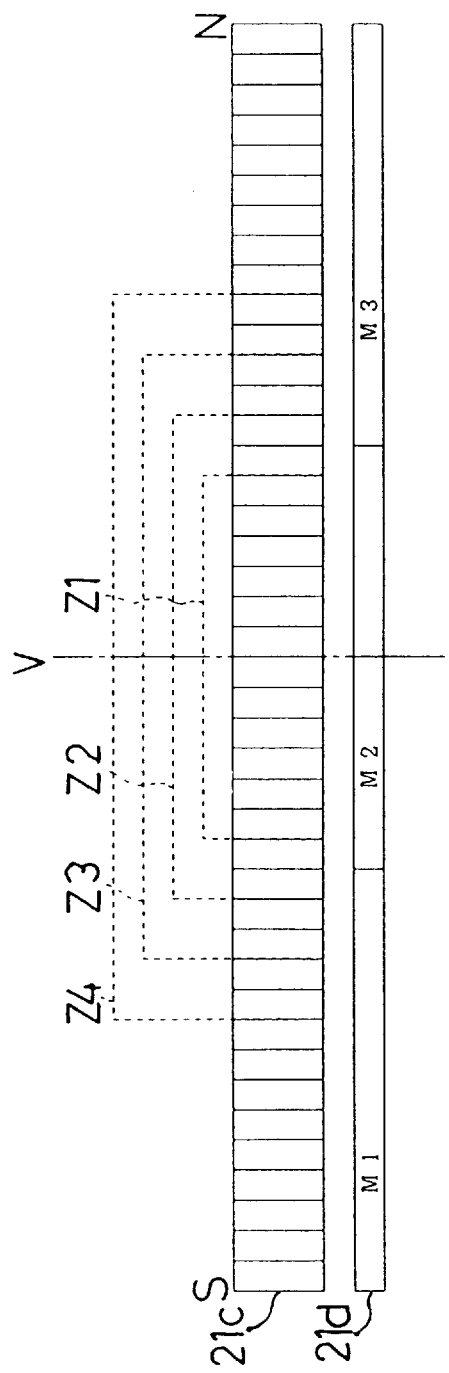
FIG. 3 is a schematic view of a reference CCD sensor of an AF sensor according to the present invention.

As shown in FIG. 3, the CCD line sensors 21c are each provided with a number of photoelectric transducers (light receiving elements) which convert the object image received into electrical charges which are integrated (accumulated). The integrated charges are successively output as AF sensor data.

The pair of CCD line sensors 21c are positioned in regard to the reticle provided on the focusing plate 14, so that the collimation axis (vertical line v) of the reticle is positioned at the center thereof (designing center), parallel to the horizontal line h, and that the horizontal line of the reticle is positioned at the center of the line h. Consequently, when the operator views an surveying staff 9, the image of the staff 9 appears perpendicular to the CCD line sensors 21c (see FIGS. 6 through 9). With such an arrangement, the direction of the surveying staff 9 does not coincide with that of the CCD line sensors 21c, and hence, the outline (shape of both sides) of the staff 9 can be detected, which facilitates automatic focusing.

The auto-level 10 defines the portion of the CCD line sensor 21c used for automatic focusing as an overall focus detecting portion Z having four focus detecting portions Z1, Z2, Z3 and Z4 symmetrically positioned along the center line (the vertical line v). The focus detecting portion Z is not mechanically or optically divided, but utilizes portions (scope) of pixels which output the AF sensor data used in the calculation for detecting the focus.

A monitor sensor 21d is provided in the vicinity of the CCD line sensor 21c, which controls integral time according to the brightness of the object image. The monitor sensor 21d is provided with three monitor sensors M1, M2 and M3.

Figure 4A:
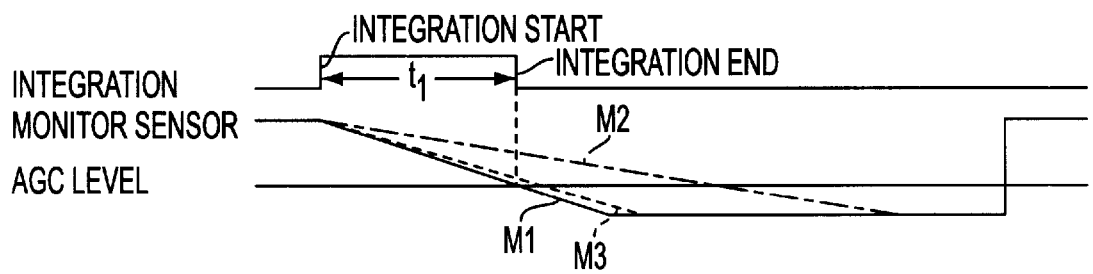
FIG. 4 is a timing chart in regard to an integration of the AF sensor, in which (A) shows an integration time in a usual case, and (B) shows an integration time when a central monitor sensor is selected.
Figure 4B:
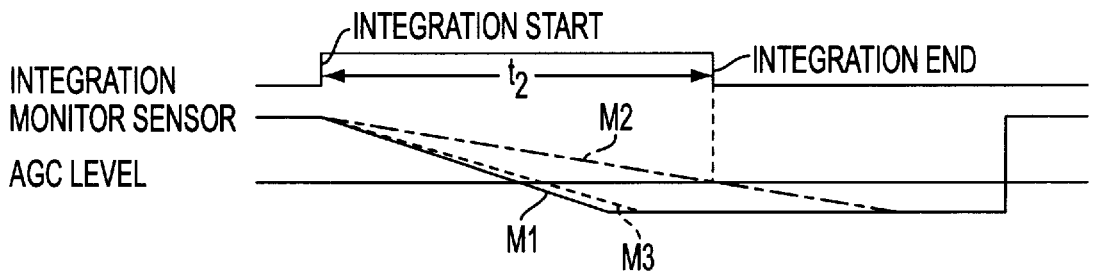

FIG. 4 illustrates examples in which an integration time is changed according to a selection of one of monitor sensors M1, M2 and M3. FIG. 4(A) is a timing chart in which all the monitor sensors M1, M2 and M3 are used, while FIG. 4(B) is a timing chart in which only the central monitor sensor M2 is used. The output of the monitor sensor is input to an unillustrated operational amplifier (OP amp) through an inverting input terminal thereof, and a reference automatic gain control (AGC) level is input to the OP amp through a non-inverting input terminal thereof. Since the output level of the monitor sensor decreases as times passes, it is designed that the integration ends when the monitor output level drops below the AGC level.

There may be some cases when the integration value obtained in the central focusing point detecting portion, which corresponds to the monitor sensor M2, is too small. In the embodiment of the present invention, this means that the brightest image is formed in the monitor sensor M1, and the darkest image is formed in the monitor sensor M2. Therefore, when the integration time is controlled by the output from the monitor sensor M1, the integration ends at time t1. At time t1, the appropriate integration value is obtained in regard to the focus detection portion which corresponds to the monitor sensor M1.

When the integration time is controlled by the output of the central monitor sensor M2, it is understood that the integration is continued until the time t2, which is later than time t1. At time t2, the appropriate integration value is obtained in regard to the central focus detecting portion M2 which corresponds to the monitor sensor M2, but there may be some cases when no appropriate integration value is obtained in the focus detecting portion which corresponds to the monitor sensor M1, since the integration value is saturated. Thus, in the embodiment of the present invention, all the monitor sensors M1, M2 and M3 are used when the maximum focus detecting portion Z is used, and the central monitor sensor M2 is used when the central focus detecting portions Z1 through Z4 are used. Consequently, the appropriate integration value is obtained with regard to the focus detecting portion that is in use.

The AF sensor data which is output from the pair of CCD line sensors 21c, is amplified by a preamplifier 22 before being supplied to the calculation/control circuit 23. The calculation/control circuit 23 calculates the amount of defocus (defocus amount) in accordance with the AF sensor data. In the illustrated embodiment, in addition to the defocus amount, the displacement and direction of the movement of an AF motor 31 (the number of output pulses, referred to hereinafter as AF pulses of an encoder 33) necessary to move the focusing lens 12 until the defocus amount becomes zero is also calculated in accordance with the defocus amount.

The calculation/control circuit 23 drives the AF motor 31 through an AF motor drive circuit 25, in accordance with the rotational direction of the AF motor 31 and the number of AF pulses. The rotation of the AF motor 31 is transmitted to the pinion 12b through a clutch-incorporated reduction gear 32 to move the focusing lens group 12 (see FIG. 1).

The rotation of the AF motor 31 is detected and counted by the calculation/control circuit 23 in accordance with the pulses output from the encoder 33. Thus, the driving or stopping is controlled in accordance with the counted value and the pulse numbers previously calculated. The focus detector 20 and the focusing lens group drive system (the lens driver) 30 moves the focusing lens group 12 in the optical axis direction in accordance with the object distance to carry out the automatic focusing operation.

The focus detector 20 is provided with an AF start switch 27 which is actuated to start the automatic focusing operation, and an AF switch 29 which detects the AF mode (that is, the mode which is not the manual focus mode). The AF start switch 27 is a press button switch, which is turned ON when pressed by an operator etc., and which is automatically turned OFF when such a pressing force is removed. The movement of the AF switch 29 is synchronized with the movement of a focusing operation knob 16 in the axial direction, which is turned OFF under the automatic focusing mode, namely when the focusing operation knob 16 is pressed.

The pinion 12b is driven in either a manual focus mode, in which the manual focusing operation is carried out using a manual focusing operation knob 16, or in an autofocus mode, in which the automatic focusing operation is carried out in accordance with the focus detector 20 and the focusing lens group drive system 30. Namely, the auto-level 10 is constructed such that the focusing mode is switched between the autofocus mode, in which the focusing lens group 12 is driven in accordance with the output of the focus detector 20, and the manual focus mode, in which the focusing lens group 12 is driven manually regardless of the output of the focus detector 20.

For instance, when the manual focusing operation knob 16, which constitutes a mode switching device, is moved in one direction along the optical axis, the manual mode is obtained, and when the manual focusing operation knob 16 is moved in another direction along the optical axis, the autofocus mode (AF mode) is obtained. The calculation/ control circuit 23 detects whether the manual focusing operation knob 16 is switched to the autofocus mode when the AF switch 29 is turned ON.

Figure 5:
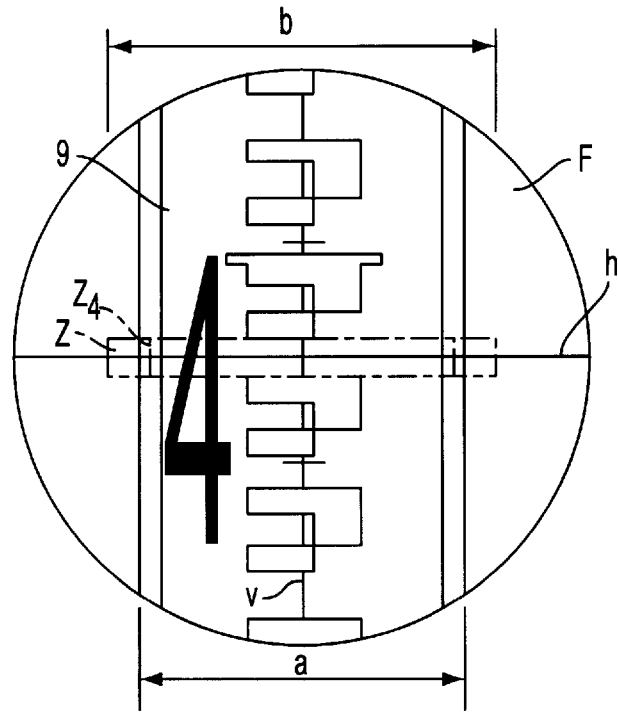
FIG. 5 is a schematic view of a relation of a surveying staff to a portion for detecting a distance measuring focus, observed in the visual field at an object distance of 5 m.
Figure 6:
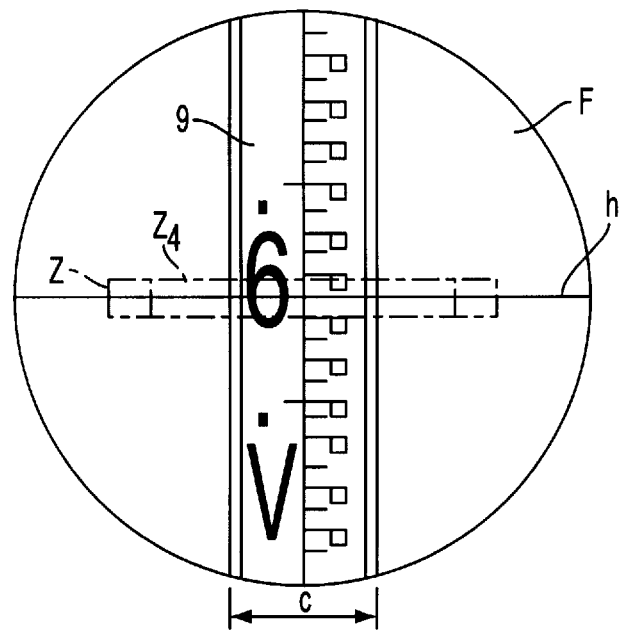
FIG. 6 is a schematic view of a relation of a surveying staff to a portion for detecting a distance measuring focus, observed in the visual field at an object distance of 10 m.
Figure 7:
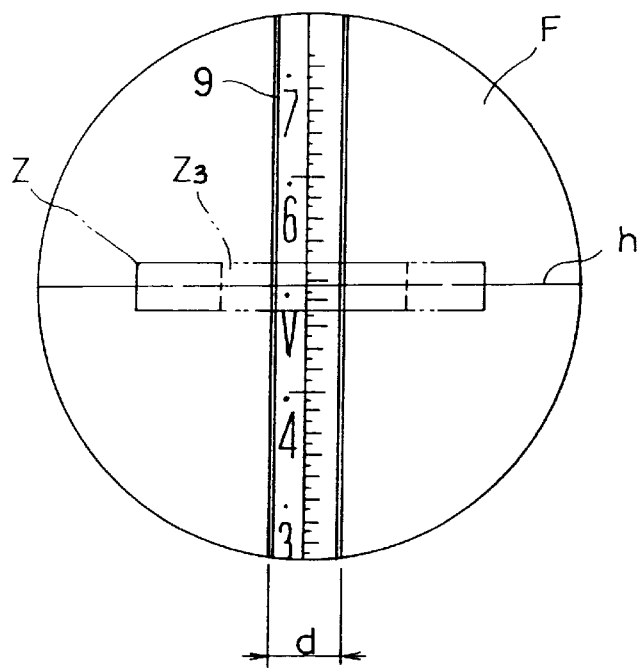
FIG. 7 is a schematic view of a relation of a surveying staff to a portion for detecting a distance measuring focus, observed in the visual field at an object distance of 20 m.
Figure 8:
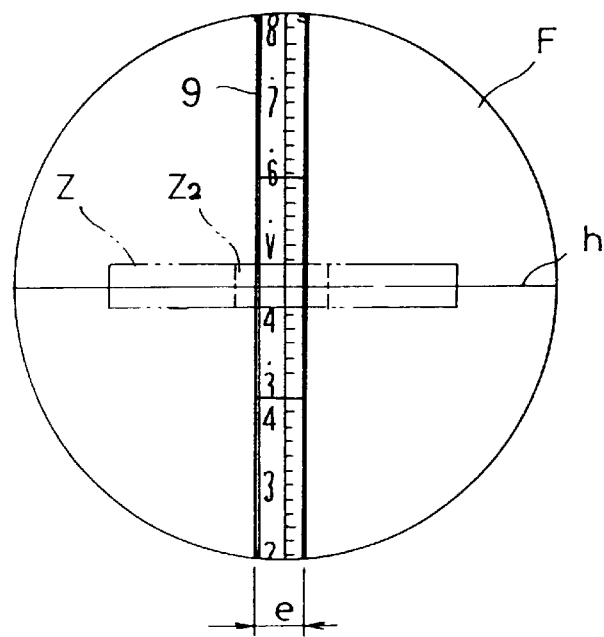
FIG. 8 is a schematic view of a relation of a surveying staff to a portion for detecting a distance measuring focus, observed in the visual field at an object distance of 30 m.
Figure 9:
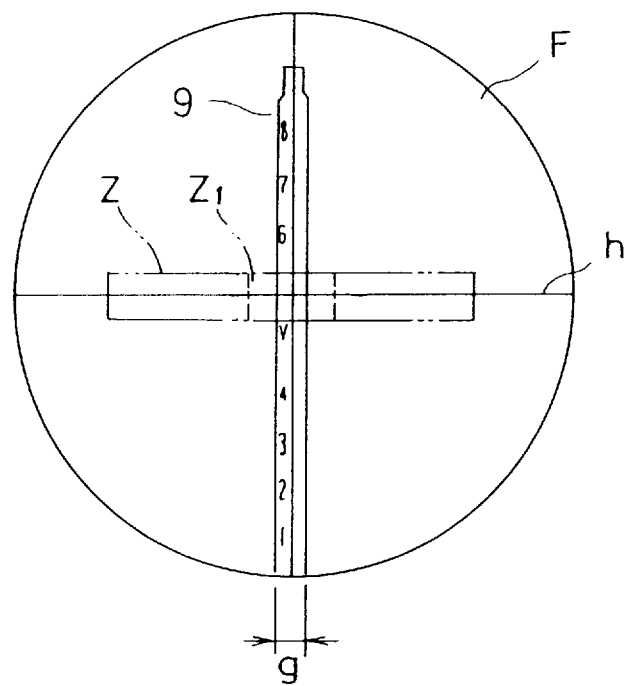
FIG. 9 is a schematic view of a relation of a surveying staff to a portion for detecting a distance measuring focus, observed in the visual field at an object distance of 50 m.
Figure 10:
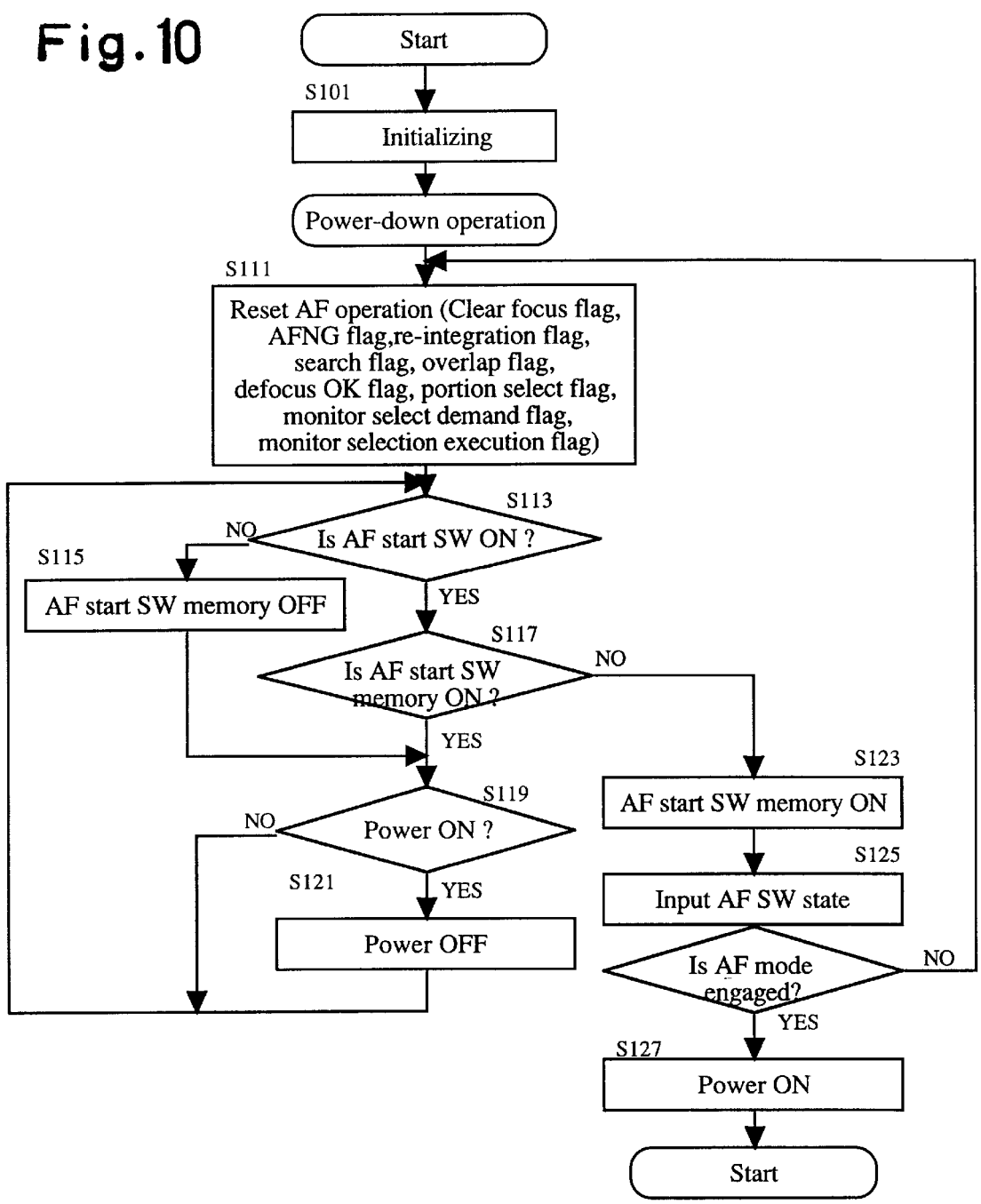
FIG. 10 is a flow chart showing a partial operation in an automatic focusing operation of an auto-level according to the present invention.

In regard to a surveying instrument such as the auto-level 10 of the present invention, which performs the automatic focusing operation based on the object image formed on the CCD line sensor 21c, when the surveying staff 9 is positioned at a short distance (e.g., 5 m, as illustrated in FIG. 5), there is little possibility of a distance measuring error due to the background thereof, because of the large ratio of the surveying staff 9 to the background thereof in the collimation field F of the collimating telescope.

In FIG. 5, "a" indicates the width of the surveying staff 9 formed on the equivalent surface 14A (in the present embodiment, 3.3 mm) when the actual width thereof is 70 mm, "b" indicates the maximum width of the focus detecting portion Z (4 mm), "h" indicates a horizontal hair line, and "v" indicates a vertical hair line, of which respective diametrical thicknesses are 0.003 mm. It is noted that the overall portion Z itself is not actually indicated, but the corresponding distance measuring zone mark is indicated instead.

However, when the object distance of the surveying staff 9 is further away from the above distance of 5 m, namely, 10 m, 20 m, 30 m, or 50 m, the width of the surveying staff 9 in the collimation field F gradually becomes smaller, which is illustrated in FIGS. 6 through 9 by "c" (1.7 mm), "d" (0.8 mm), "e" (0.6 mm) and "g" (0.3 mm), respectively. The maximum width of the focus detecting portion Z of the CCD line sensor 21c remains the same, thus the ratio of the background portion in the collimation field gradually increases.

The following table shows the ratios of the collimation field F to the CCD line sensor 21c, of the image size of the surveying staff 9 on the focusing plate (reticle) 14 when the surveying staff 9 is positioned at several distances from the auto-level 10, in which, the magnification of the collimating telescope consisting of the collimating objective lens group 11 and the focusing lens group 12, is set to be 24, the diameter of the frame of the visual field of a finder on the focusing plate 14 is approximately 6 mm, the light receptive portion of the CCD line sensor 21c (the maximum focus detecting portion Z) is approximately 4 mm, the synthetic focal length of the collimating objective lens group 11 and the focusing lens group 12 is approximately 240 mm, and the width of the surveying staff 9 is 70 mm, of which visual fields are respectively illustrated in FIGS. 5 through 9:

| D(m) | I.S.(mm) | I.S./V.F.P(%) | I.S./S.D.P(%) |
|------|----------|---------------|---------------|
| 3    | 3.5      | 93            | 138           |
| 5    | 3.3      | 56            | 82            |
| 10   | 1.65     | 28            | 41            |
| 20   | 0.83     | 14            | 21            |
| 30   | 0.55     | 9             | 14            |
| 50   | 0.33     | 6             | 8             |

(D = Distance, I.S. = Image Size, V.F.P. = Visual Field Portion, S.D.P. = Sensor Detect Portion)

As shown in the above table, in the case of the fixed width of the maximum focus detecting portion Z of the CCD line sensor 21c, when the object distance is more than 10 m, the ratio of the surveying staff 9 occupying the maximum focus detecting portion Z becomes very small. Consequently, it can be understood that as the object distance becomes longer, the ratio of the background, namely the portion other than the surveying staff 9 occupying the collimation field F, becomes larger. In such a case, due to the background, it is likely that distance measuring and focusing is performed based on the background which leads to the image of the staff 9 being formed out of focus, or that the focusing cannot be carried out at all.

Consequently, the auto-level 10 of the present invention sets a plurality of focus detecting portions (in the present embodiment, the overall focus detecting portion Z, and the focus detecting portions Z1 through Z4 in the order from the central focus detecting portion Z1), with the collimation axis being the center thereof. The focus detecting portions mentioned above firstly detect any contrast in the maximum focus detecting portion Z, and if an effective contrast is obtained, the detection of contrast is started from the narrowest, central focus detecting portion Z1. When an effective contrast is not obtained at the center focus detecting portion Z1, the next focus detecting portion Z2 is then selected, and such a selection continues in the order of the focus detecting portions Z2, Z3 and Z4 until an effective contrast is obtained. The defocus amount is calculated by using the AF sensor data of the focus detecting portion in which the effective contrast is found, and the focusing lens group 12 is actuated to move based on the obtained defocus amount. If no effective contrast is obtained in any of the focus detecting portions Z1 through Z4, focusing is performed using the AF data of the maximum focus detecting portion Z.

As can be understood from the foregoing, by selecting a focus detecting portion, it is possible to detect the focus according to the AF detecting portion corresponding to the width of the aiming object, and hence inaccurate distance measuring, such as focusing on the background of the aiming object, is eliminated.

The automatic focusing operation of the auto-level 10 is discussed below with reference to the flow charts shown in FIGS. 10 through 17. The automatic focusing operation is performed by the calculation/control circuit 23 when the battery (not shown) is loaded in the auto-level 10.

According to the illustrated embodiment of the present invention, once the AF start switch 27 is turned ON, the automatic focusing operation continues even after the AF start switch 27 is turned OFF.

When the battery (unillustrated) is loaded, the present operation is actuated. Firstly, an internal RAM and input/output ports, etc. are initialized at step S101 to enter the power-down operation. Thereafter, the operation at step S101 is not performed again unless the battery is unloaded and is then reloaded.

The power-down operation corresponds to a stand-by operation in which the power source is OFF (except to the calculation/control circuit 23) while the AF start switch 27 is OFF to wait for an operation of the AF start switch 27. If the AF start switch 27 is turned ON, the power source is turned ON to perform the focusing operation.

In the power-down operation, a flag for the AF operation (focusing operation) is cleared (set to be zero), so that the operation ends (step S111).

In the illustrated embodiment, there are several types of flags including a focusing flag which represents that a focused state is obtained, an AFNG flag which represents that the automatic focusing operation cannot be carried out, a re-integration flag which represents that the integration operation is performed after the focused state has been obtained, a search/overlap flag which is adapted to discriminate that the integral operation is performed during the movement of the focusing lens 12, a defocus OK flag which represents that the effective defocus amount is obtained, a portion select flag which represents that the AF focus detecting portion is selected, a monitor select demand flag which demands selection the monitor sensor, and a monitor selection execution flag which represents that the monitor sensor is selected.

If the reset operation for the AF operation is completed, whether the AF start switch 27 is turned ON is checked (step S113). Since the AF start switch 27 is OFF at the initial position in which no operation by the operator occurs, the AF start switch memory is OFF (OFF data is written) at steps S113, S115. Thereafter, whether the power source is ON is checked at step S119. Since the power source is OFF at the initial position in which no power is supplied to each circuit, the control is returned to step S113 and the operations at steps S113, S115 and S119 are repeated.

If the AF start switch 27 is turned ON at S113, the control proceeds to step S117 to check whether the AF start switch memory is ON. If the AF start switch memory is OFF, the control proceeds to step S123 to turn the AF start switch memory ON (write ON data). Thereafter, if the AF switch 29 is OFF, which corresponds to the manual focusing mode, the control is returned to the power-down operation (step S125). If the AF switch 29 is turned ON, the power source is turned ON to supply power to the circuits in order to perform the VDD loop operation (steps S125, S127).

When the control is returned to the power-down operation, the AF start switch memory is turned ON. Consequently, since the AF start switch 27 is ON, the control proceeds from steps S111, S113, S117, S119 to step S121, in order to stop the power supply and then to wait for the AF start switch 27 to be turned ON. If the AF start switch 27 is turned OFF, the control proceeds to step S115 from step S113 to write the OFF data in the AF start switch memory. Thereafter, the control proceeds to step S121 from step S119, in order to stop the power supply and then to wait for the AF start switch 27 to be turned ON.

In the VDD loop operation, the focusing operation is carried out to obtain a focused state while detecting the state of the AF switch 29, and if focusing is not possible, the control is returned to the power-down operation.

When the control enters the VDD loop operation, the state of the AF switch 29 is input again (step S125). If the AF switch 29 is OFF, which corresponds to the manual focus mode, the control is returned to the power-down operation (FIG. 11; steps S201, S203) and the AF operation ends. The following discussion will be given on the assumption that the AF switch 29 is ON.

If the AF switch 29 is ON, the AF operation (focusing operation) is performed to detect the defocus amount and move the focusing lens 12 to a focal position in accordance with the defocus amount (step S205). During the AF operation, whether the AF start switch 29 is ON is periodically checked (step S207). At the first check, the AF start switch 27 is usually ON, and hence, whether the AF start switch memory 29 is ON is checked. Since the latter has been turned ON at step S123, the focus flag and the AFNG flag are checked at steps S211, S213, S215. Since the focus flag and the AFNG flag are both cleared if a focused state is not obtained or it is impossible to perform the focusing operation are during the AF operation, the control is returned to step S201.

The operations at steps S201, S203, S205, S207, S211, S213, and S215 are repeated until the focus flag is set to "1" or the AFNG flag is set to "1". If the AF start switch 27 is OFF during such an operation, the control proceeds to step S209 from step S207 to store the OFF data in the AF start switch memory and is repeatedly returned to step S201 from step S215.

Normally, the focusing lens 12 is moved to the focal position during the AF operation at step S205. Consequently, the focus flag is set to "1" and the control is returned from step S213 to the power-down operation to finish the AF operation. If focusing cannot be effected for some reason, for example, when the aiming object moves, or is too dark or is too low in contrast, the AFNG flag is set to "1" to return the control to the power-down operation (S215), and thus the control ends (step S111).

When the control is returned to the power-down operation, the AF start switch memory is turned ON if the AF start switch 27 is ON. Consequently, the control proceeds from steps S113, S117, S119 to step S121, in order to stop the power supply. If the AF start switch 27 is turned OFF, the control proceeds to step S115 from step S113 to write the OFF data in the AF start switch memory. Thereafter, the control proceeds to step S121 from step S119, in order to stop the power supply and to wait for the AF start switch 27 to be turned ON.

In any of the above cases, when the control is returned to the power-down operation, the power supply is stopped so that the power supply to the peripheral circuits other than the calculation/control circuit 23 is removed.

If the AF start switch 27 is turned ON again after it has been turned OFF during the VDD loop operation, the control proceeds to step S211 from step S207. Since the AF start switch memory is OFF at the first step, the control proceeds to step S217 from step S211 to store the ON data in the AF start switch memory. Thereafter, the control is returned to step S201, and the control proceeds to steps S201 through S207, S211 through S215 and S201.

As can be understood from the foregoing, once the AF start switch 27 is turned ON, the focusing operation is repeated until a focused state is obtained or the impossibility of the focusing operation is detected. Thus, the user can execute the surveying operation without a concern regarding the focusing operation.

If the AF start switch 27 is turned ON during the VDD loop operation, namely, if the manual focusing operation knob 16 is moved to the manual focus position, the control is returned from step S203 to the power-down operation and then the AF operation ends.

The AF operation will be described below in detail with reference to the flow charts shown in FIGS. 12 through 17.

Figure 12:
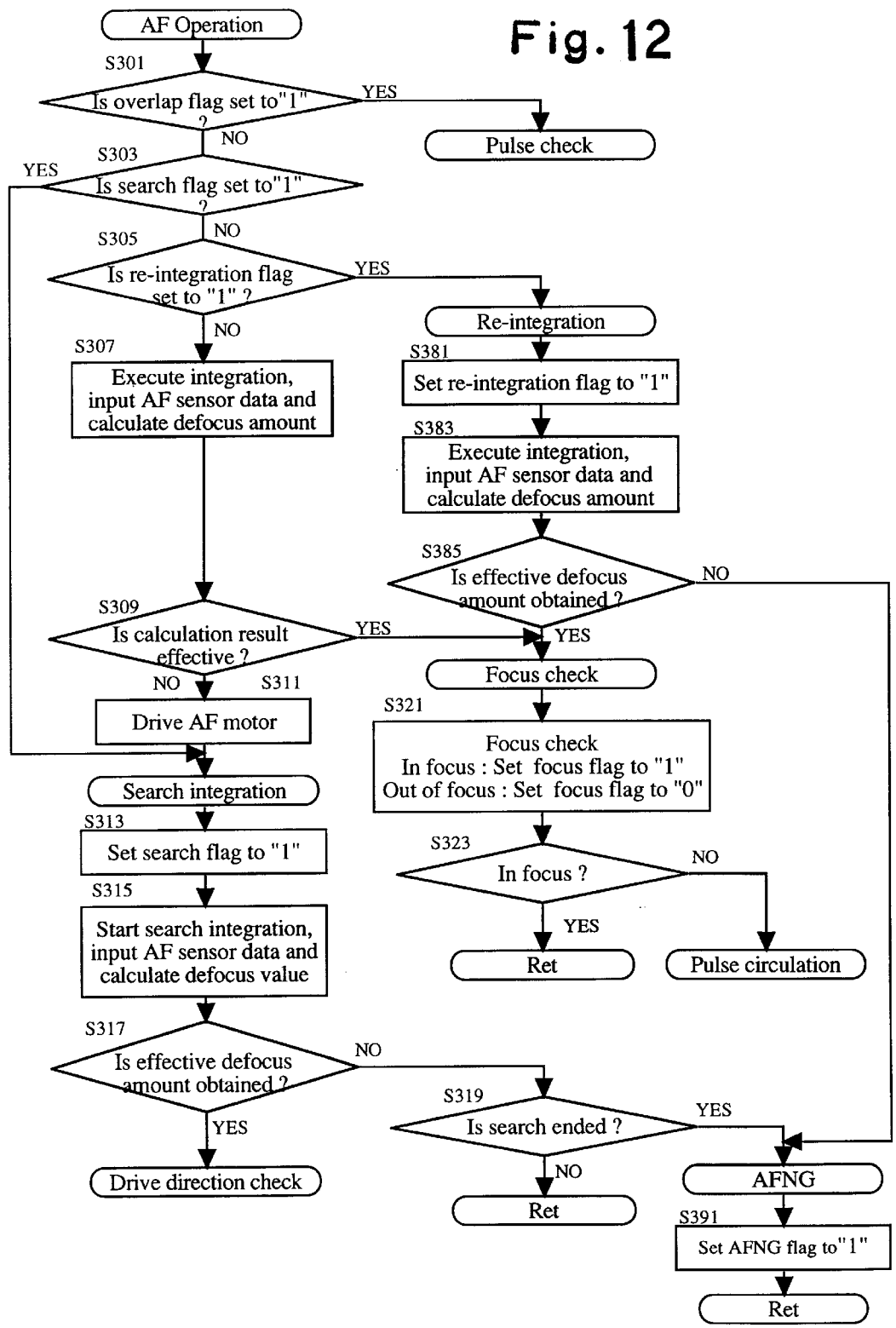
FIG. 12 is a flow chart showing a partial operation in an automatic focusing operation of an auto-level according to the present invention.

When the control enters the AF operation, the overlap flag, the search flag and the re-integration flag are checked (FIG. 12; steps S301, S303, S305). Since all the flags have been cleared at step S111 at the first step, the AF sensor executes the integration and the integration result is input as AF sensor data to calculate the defocus amount (step S307). As is well known, in the calculation of the defocus amount, a correlation ratio of the data of a pair of AF sensors is obtained, so that the direction of defocus (front focus or rear focus) and the defocus amount can be obtained in accordance with the correlation ratio.

Whether the calculation result is effective is checked at step S309. If the contrast of the aiming object is too low, or the aiming object is a repetitive pattern, or the object brightness is too low, there is a possibility that the calculation result is ineffective. Normally, an effective calculation result is obtained, and hence the effective calculation result will be discussed below first.

If the calculation result is effective, the focus check operation is performed. If a focused state is obtained the focus flag is set to "1", and if the telescope is out-of-focus the focus flag is set to "0" (step S321). In the illustrated embodiment, when the defocus amount is within a predetermined limit or allowance, it is considered that a focused state is obtained. If the focused state is obtained at step S323, the control is returned to the VDD loop operation to perform the operations at step S207 and steps subsequent thereto. In the case of an out-of-focus state, the control proceeds to the pulse calculation operation.

In the pulse calculation operation, the amount of drive of the AF motor 31 (the number of AF pulses supplied from the encoder 33) necessary to move the focusing lens 12 until the defocus amount is zero is calculated.

Figure 13:
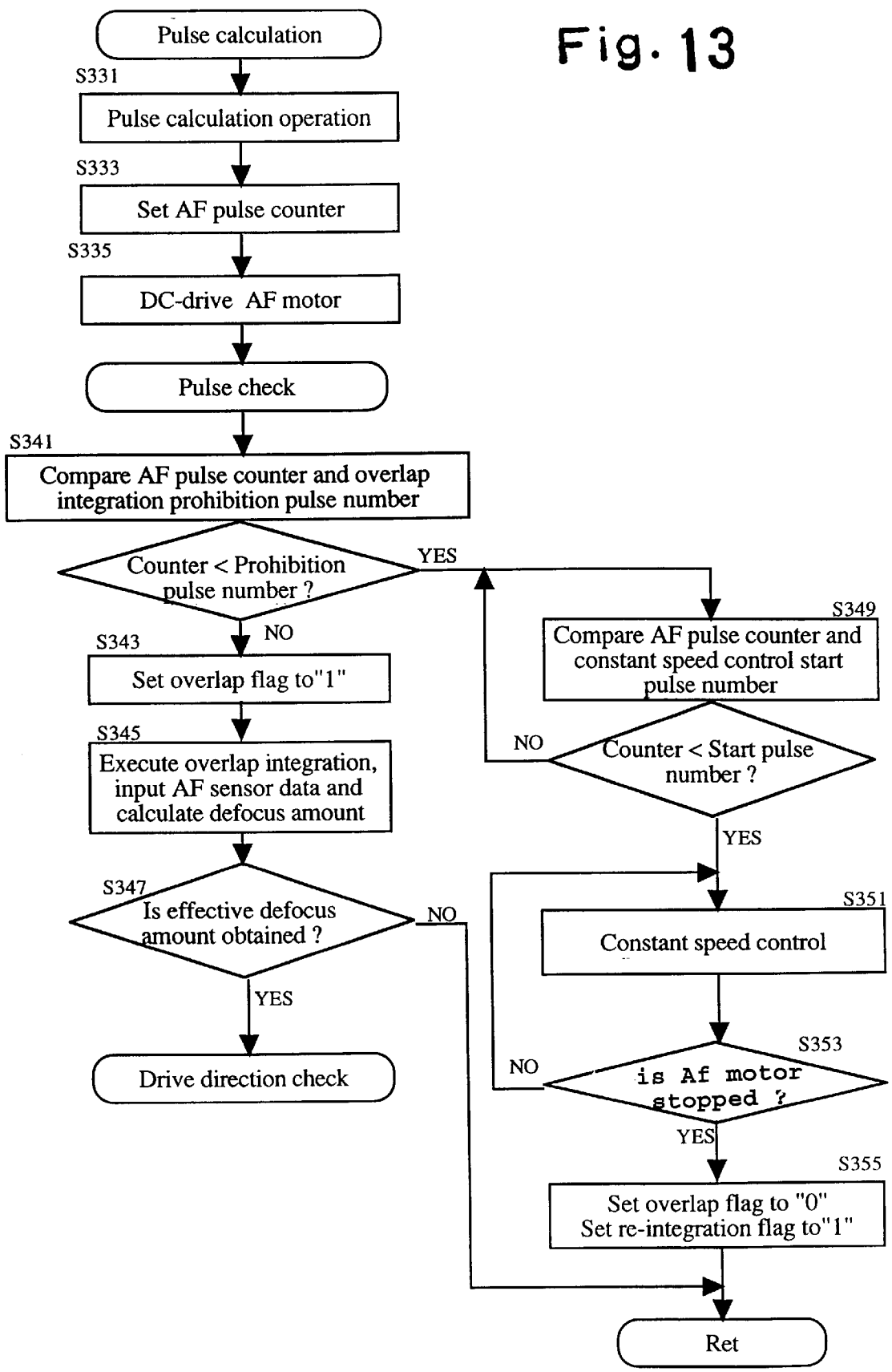
FIG. 13 is a flow chart showing a partial operation in an automatic focusing operation of an auto-level according to the present invention.

In the AF pulse calculation operation, the drive direction of the AF motor 31 and the number of AF pulses are calculated in accordance with the defocus amount (see FIG. 13, step S331). The AF pulse number is set in the AF pulse counter 23a and the AF motor 31 is DC-driven and the pulse checking is carried out (steps S333, S335). The value of the AF pulse counter 23a is decremented by one every time one AF pulse is output from the encoder 33.

In the pulse check operation, the drive speed of the AF motor 31 is controlled in accordance with the value of the AF pulse counter 23a. Namely, the counted number is larger than the overlap integration prohibition pulse number. The AF motor 31 is driven at a high speed to move the focusing lens 12 toward the focal position within a short space of time and the overlap integration is effected. When the counted number is smaller than the overlap integration prohibition pulse number, the AF motor 31 is driven at high speed, but the overlap integration is prohibited. If the counted number is smaller than a constant speed control start pulse number, the AF motor 31 is PWM (Pulse Width Modulation) driven at low speed to prevent the focusing lens from moving to a hyperfocal distance of the telephotographic system. When the counted number is zero, the AF motor 31 is stopped.

When the control enters the pulse check operation, the value of the AF pulse counter 23a is compared with the overlap integration prohibition pulse number (step S341). If the counter value is larger than the overlap integration prohibition pulse number, the control proceeds to step S343 in which the overlap flag is set to "1". Thereafter, the overlap integration begins, and the AF sensor data is input from the AF sensor 21 to perform the defocus amount calculation (step S345). If an effective calculation result is obtained, the control proceeds to the drive direction check operation, and if no effective calculation result is obtained, the control is returned (step S347).

In the drive direction check operation, the AF pulse number is calculated and set in the counter, based on the AF sensor data obtained by the integration during driving of the AF motor 31. If the drive direction changes, the AF motor 31 is braked and stopped. In the illustrated embodiment, the AF motor 31 is braked by a short-circuit of the opposite electrodes of the AF motor 31.

Figure 14:
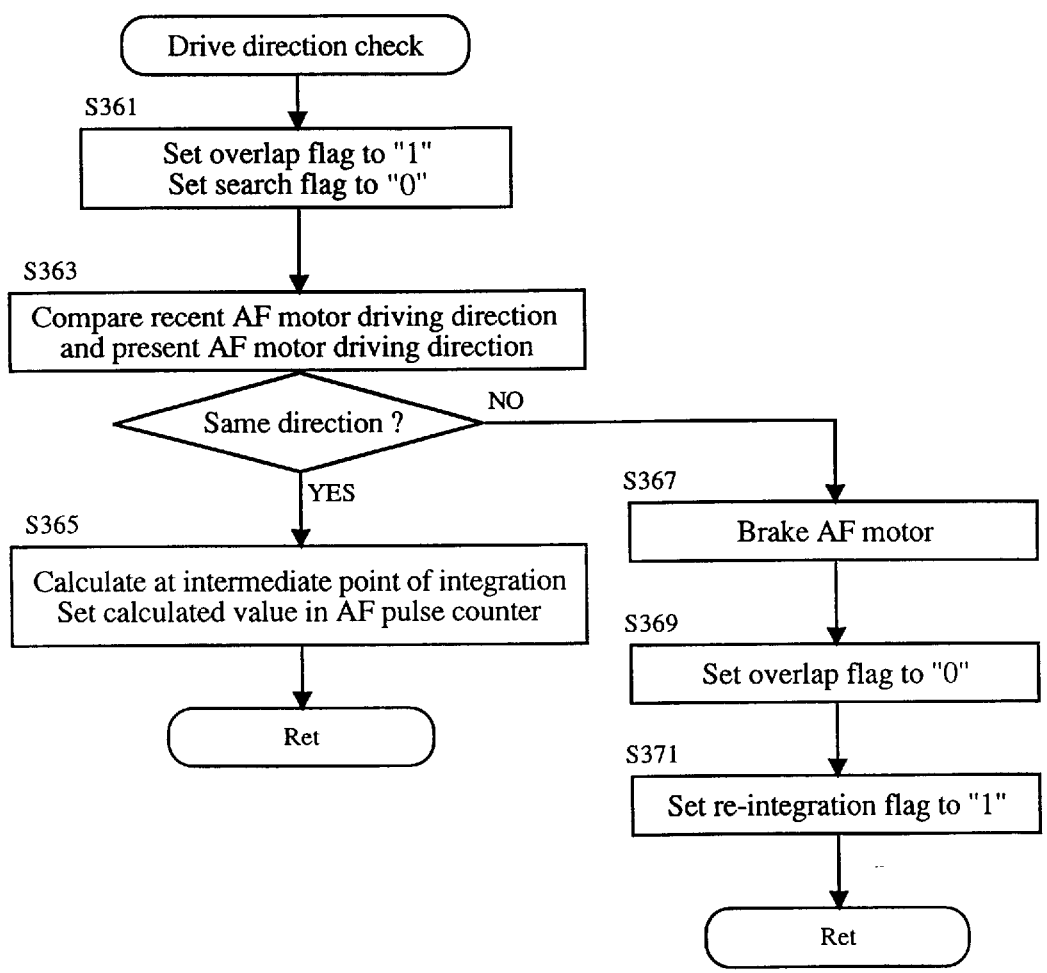
FIG. 14 is a flow chart showing a partial operation in an automatic focusing operation of an auto-level according to the present invention.

When the control enters the drive direction check operation, the overlap flag is set to "1", and the search flag is set to "0" (see FIG. 14, step S361). Thereafter, the previous and present drive directions of the focusing lens group 12 are compared in accordance with the calculation result (step S363). Normally, the directions are identical, and hence, the AF pulse number is calculated at an intermediate point of the integration, so that the calculated value is set in the counter (steps S363, S365). Subsequently, the control is returned.

If the drive direction changes, the AF motor 31 is braked and stopped. Consequently, the overlap flag is set to "0" and the re-integration flag is set to "1". Thereafter, the control is returned to the VDD loop operation (steps S363, S367, S369, S371).

When the control is returned to the VDD loop operation, the operations at step S207 (FIG. 11) and steps subsequent thereto are carried out to enter the AF operation. If no change in the drive direction occurs, the control proceeds to the pulse check operation from step S301 since the overlap flag is set to "1". The operations from step S341 to S347 and the operations of the drive direction check operation from step S361 to S365 are carried out and the control is returned to step S205 for the pulse check operation. These operations are repeated until the counter value is smaller than the overlap integration prohibition pulse number.

In the above mentioned operations, the pulse number necessary to move the focusing lens to the focal position is decreased and normally becomes smaller than the overlap integration prohibition pulse number. Thus, the control proceeds from step S341 to S349 of the pulse check operation.

The operations from step S349 to S355 are effected to stop the AF motor 31 upon completion of the driving of the AF motor corresponding to the calculated pulse number. At step S349, control does not proceed until the AF pulse number is smaller than the constant speed control start pulse number. If the AF pulse number is smaller than the constant speed control start pulse number, the AF motor 31 is driven at a low speed in accordance with the remaining pulse number. When the pulse number is zero, the AF motor 31 is stopped (step S349, S351, S353). When the AF motor 31 is stopped, the overlap flag is set to "0", and the re-integration flag is set to "1" (steps S353, S355). Thereafter, the control is returned to the VDD loop operation.

If the control proceeds to step S205 (FIG. 11) of the VDD loop operation, the control then enters the re-integration operation at step S305 (FIG. 12), since the overlap flag and the search flag are set to "0" and the re-integration flag is set to "1". The same is true when the drive direction changes at step S363.

In the re-integration operation, the defocus amount is calculated and whether the telescope is focused is checked in accordance with the defocus amount thus obtained. If the focused state is obtained, the focus flag is set to "1", and if the focused state is not obtained, the AF pulse is calculated again to move the focusing lens.

Figure 11:
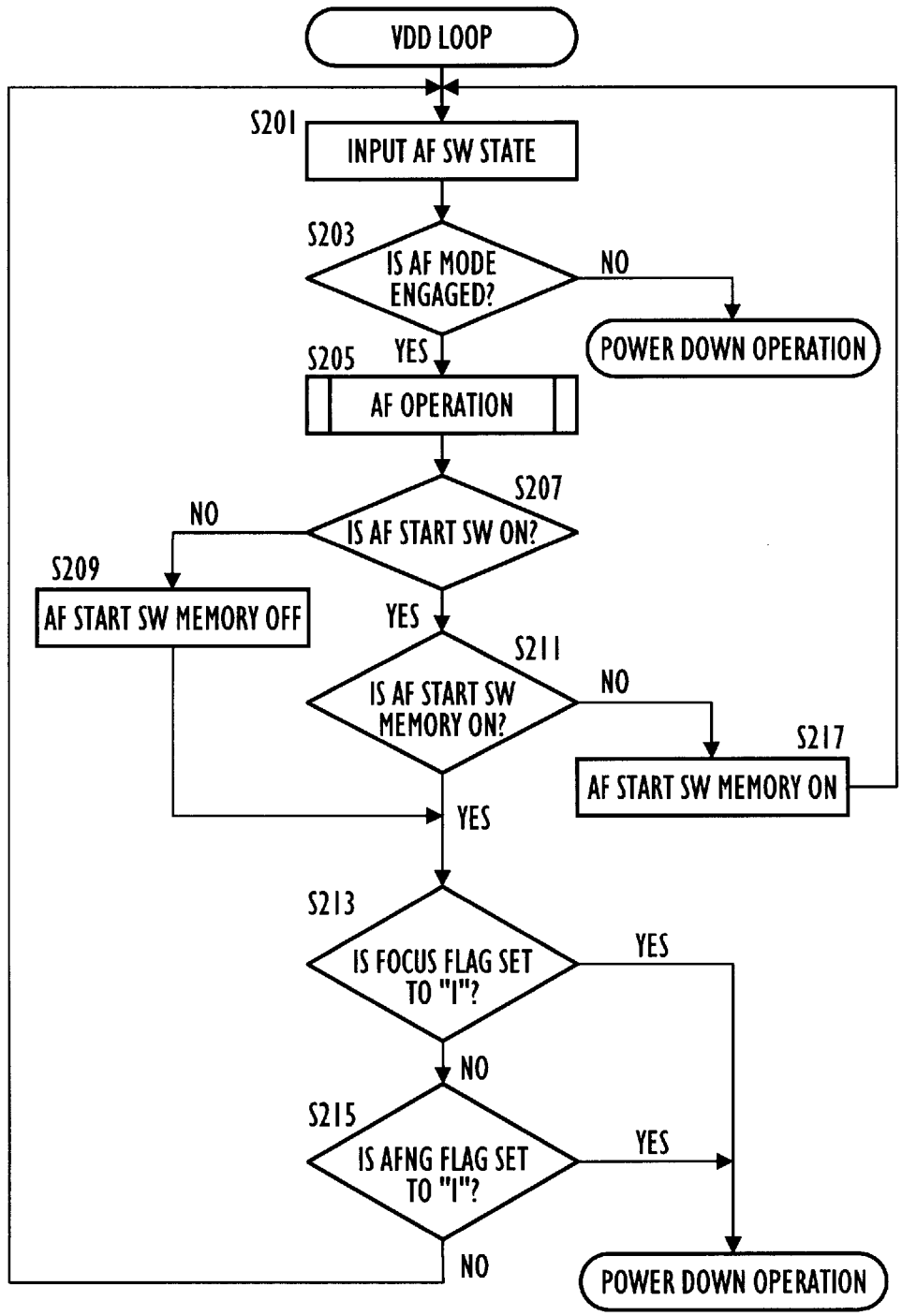
FIG. 11 is a flow chart showing a partial operation in an automatic focusing operation of an auto-level according to the present invention.

If the control is returned to the VDD loop operation when the focus flag is set to "1", the control proceeds to the power down operation from step S213 (FIG. 11). Thus, the AF operation ends and the control waits for the operation of the AF start switch 27.

The above discussion can be applied when the focused state is correctly obtained. In the case that it is difficult or impossible to obtain a focused state for some reason, the control enters the VDD loop operation and is returned to the power-down operation. This will be discussed below.

In the first AF operation, the integration begins, the AF sensor data is input, and the defocus amount is calculated at step S307 in FIG. 12 (steps S301, S303, S305). If it is impossible to calculate the effective defocus amount for some reason, i.e., for example when the object contrast is too low, the control proceeds to the search integration operation from step S309.

In the search integration operation, the integration and the defocus calculation are carried out to obtain an effective defocus amount while driving the AF motor 31 from a close focal position to an infinite focal position. If no effective defocus amount is obtained even by the search integration operation, the AFNG flag is set to "1" and the control is returned and enters the power-down operation at step S215.

In the search integration operation, the AF motor 31 is search-driven (in the direction of the close focal position) and the search flag is set to "1" to commence the integration by the AF sensor 21. When the integration is completed, the integral value is input as the AF sensor data to calculate the defocus amount (steps S311, S313, S315). If the effective defocus amount is obtained, the control proceeds to step S317 to the drive direction checking operation. If no effective defocus amount is obtained, the control is returned to the VDD loop operation to perform the operations at step S205 and steps subsequent thereto (steps S317, S319).

The AF motor search-driving operation refers to an operation in which the AF motor 31 is first driven in the direction of the close focal position and when the focusing lens 12 reaches and stops at a movement extremity on the close distance side, the AF motor 31 is driven in the reverse direction, i.e., in the infinite focal position. When the focusing lens group 12 reaches and stops at a movement extremity on the infinite object distance side, the AF motor 31 is stopped. If an effective calculation result is obtained during the search driving, the AF motor is driven in accordance with the effective value of the defocus amount.

When the control enters the operation at step S205 of the VDD loop operation, the overlap flag is cleared. Since the search flag is set to "1", the control enters the search integration operation at step S303 and the search integration operations at step S313 and steps subsequent thereto are carried out. If no effective calculation result is obtained when the focusing lens group 12 reaches the infinite focal position, the control enters the AFNG operation, in which the AFNG flag is set to "1". Thereafter, the control is returned to the VDD loop operation and enters the power-down operation at step S215 (steps S317, S319, S391).

The above discussion has been directed to the case when no effective calculation result is obtained from the beginning. Once an effective calculation result is obtained, so that the focusing lens 12 is moved but no focused state is still obtained, if no effective calculation result is obtained by the re-integration operation (steps S381, S383), the control proceeds to the AFNG operation at step S385. The AFNG flag is set to "1" in the AFNG operation and thereafter, the control is returned to the VDD loop operation and enters the power-down operation at step S215 (S385, S391).

Figure 15:
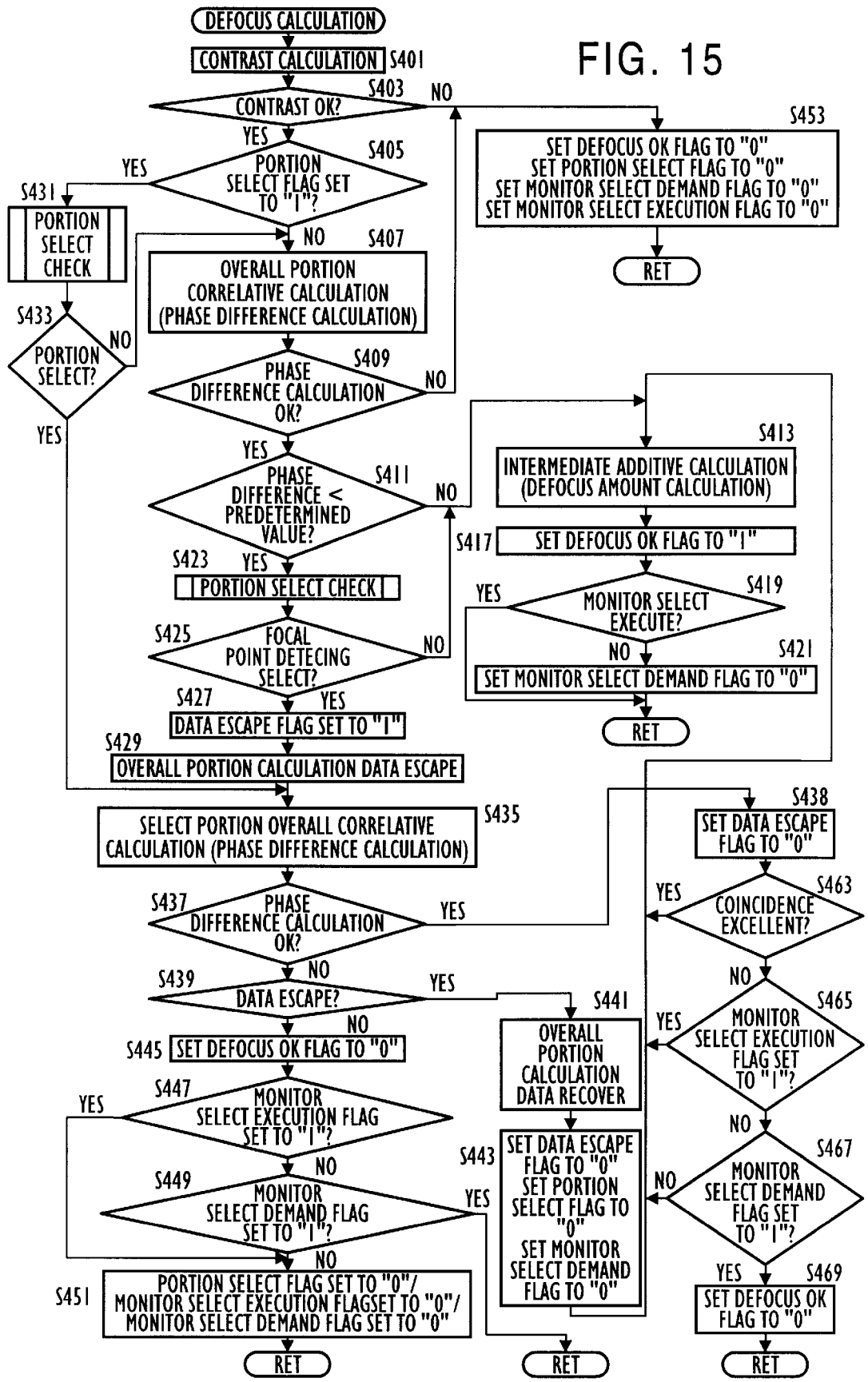
FIG. 15 is a flow chart showing a defocus calculating operation in an automatic focusing operation of an auto-level according to the present invention.

The details of the defocus operation will now be described with reference to FIG. 15, which is executed at steps S307, S315, S345 and S383. A criteria used in the operation of the present embodiment is whether the contrast thereof is high or low. The defocus operation in the present embodiment firstly detects a contrast at the maximum focus detecting portion Z, and when the effective contrast is more than the predetermined value, the contrast is detected in the order from the narrowest central focus detecting portion Z1. If no effective contrast is obtained, the contrast is checked in the order of the focus detecting portions Z2, Z3 and Z4 until an effective contrast is obtained. Thereafter, the defocus amount is calculated by using the AF data in any of the focus detecting portions (namely, the narrowest portion), and the focusing lens group 12 is driven in accordance with the obtained defocus amount. If no effective contrast is obtained in any of the selected focus detecting portions Z1 through Z4, focusing is operated by using the AF data in the maximum focus detecting portion Z, which is one of the most characteristic parts of the present invention.

When the control enters the defocus operation, the contrast calculation is firstly executed based on the AF data from the maximum focus detecting portion Z (step S401). The contrast calculation utilizes, for example, the sum of the absolute value of the remainders of the integration value of the pixels (photoelectric transducers) adjacent to the used portion.

$$\sum_{n=s}^{N-1} |A_n - A_{n+1}| \qquad \text{(Formula 1)}$$

In formula 1 above, "S" represents the bit number of the first pixel in the focus detecting portion, and "N" represents the bit number of the last pixel in the focus detecting portion.

As can be understood from the above formula, if the sum of the remainders of the integrated value is larger than the predetermined value, it is judged that sufficient contrast has been obtained. On the other hand, in the case that it is judged that no effective contrast has been obtained, the defocus OK flag, the portion select flag, the monitor select demand flag and the monitor select execution flag are respectively set to "0" and control returns (steps S403, 453).

The defocus OK flag represents whether an effective defocus is obtained, the portion select flag represents whether the focus detection portion is selected, the monitor select demand flag demands selection of the monitor sensor, and the monitor select execution flag represents that the selection of the monitor sensor is executed.

When an effective contrast of more than the predetermined value is obtained, whether the portion select flag is set to "1" or not is checked. At the first operation, since the portion is not selected, the correlative calculation is executed by using the AF sensor data obtained in the maximum focus detecting portion Z, and hence, the phase difference is calculated (steps S403, 405, 407). If no phase difference is calculated, the flag clearance operation is executed at step S453, and the control returns (S409). If no focused position of the image formed on the pair of focus detecting portions Z is detected, such as the case that the image formed on the focus detecting portion Z is extremely out-of-focus, it is impossible to calculate the phase difference.

When the effective phase difference is obtained, whether the phase difference is less than the predetermined value (namely, whether or not the error in focus is small) is determined. When the phase difference is large, namely when the error in focus is significant, the focus detecting portion select is not executed, and control proceeds to the intermediate additive calculation operations and the defocus amount is calculated by the maximum focus detecting portion Z (steps S411, S413), and the defocus OK flag is set to "1" (S417). Consequently, whether the monitor select execution flag is set to "1" is checked. If it is set to "1", control is directly returned at step S419, and if it is not set to "1", the monitor select demand flag is set to "0" and control is returned (steps S419, S421).

While the phase difference is not less than the predetermined value, control repeats steps S401 through S411 and S413 through S417.

When the phase difference is less than the predetermined value, control proceeds to step S411 from S423 in order to execute the portion select check operation. The portion select check operation refers to the operation in which the contrast check is performed in the order from the narrowest focus detecting portion Z1, in order to select, the first focus detecting portion in which a contrast not less than the predetermined value is obtained, namely, the narrowest focus detecting portion in which a contrast not less than the predetermined value is obtained. When an effective contrast less than the predetermined value is obtained, selection of the focus detecting portion is not performed.

When control is returned from the portion select check operation, whether the focus detecting portion is selected is checked. If the focus detecting portion is not selected, control proceeds to step S413. If the focus detecting portion is selected, the data storage flag is set to "1", so that the correlative calculation data (calculated data of the phase difference) of the maximum (overall) focus detecting portion is stored once in the predetermined address of RAM (steps S427, S429) in the calculation/control unit 23.

The correlative calculation is executed in regard to the selected focus detecting portion, in order to calculate the phase difference (step S435). If no effective phase difference is obtained whether the data stored is checked (steps S437, S439). Since the data storage, calculation data of each portion is read from RAM, and all the portions are selected as effective, then control proceeds to the intermediate additive calculation operation after the data storage flag, the portion select flag and the monitor select demand flag are respectively set to "0" (steps S437, S439, S441, S443, S413).

When the effective phase difference is obtained, the data storage flag is set to "0" at step S438, then if the coincidence condition is satisfied, control proceeds to the intermediate calculation operation at steps S463, S413.

If the coincidence condition is not satisfied according to any three-dimensional image, such as the case that the contrast of the selected focus point detecting portion is low, control proceeds to the intermediate additive calculation at step S413, as long as the monitor select demand flag is set to "1" (steps S463, S465, S467). When the monitor select execution flag is not set to "1" while the monitor select demand flag is set to "1", the defocus flag is set to "0" and control is returned (steps S465, S467, S469).

When the control enters the defocus calculation operation after the portion select flag is set to "1" according to the selection of any of the focus detecting portions Z1 through Z4, control proceeds to step S431 from S405, so that the portion select check operation is executed. If none of the focus detecting portions is selected control is returned to step S407 in order to use the maximum focus detecting portion Z (steps S433, S407), and if any of the focal detecting portions is selected control proceeds to step S435 so that the correlative calculation and the phase difference calculation is executed in regard to the selected portion (steps S433, S435).

The calculation of the phase difference of the selected portion is executed through steps S431, S433 and S435. After such an execution, if the effective phase difference is obtained, control proceeds in accordance with the above-mentioned operation. If no effective phase difference is obtained, since the calculation data of all the portions have not been stored, control proceeds to step S445 from S439 so that the defocus OK flag is set to "0". If the monitor select execution flag is set to "1", the portion select flag, the monitor select demand flag, and the monitor select execution flag are respectively set to "0", then control is returned (steps S447, S451). Even in the case that the monitor select execution flag is not set to "1", unless the monitor select demand flag is set to "1", control is returned after executing the flag clear operation at step S451. If the monitor select demand flag is set to "1", control is returned at once (steps S447, S449, S451, or steps S447, S449).

In the above-mentioned defocus calculation operation, the defocus amount is calculated based on the AF sensor data, in the narrowest focus detecting portion among the focus detecting portions in which the contrast not less than the predetermined value is obtained, on condition that the a contrast not less than the predetermined value is obtained in the overall portion.

Figure 16:
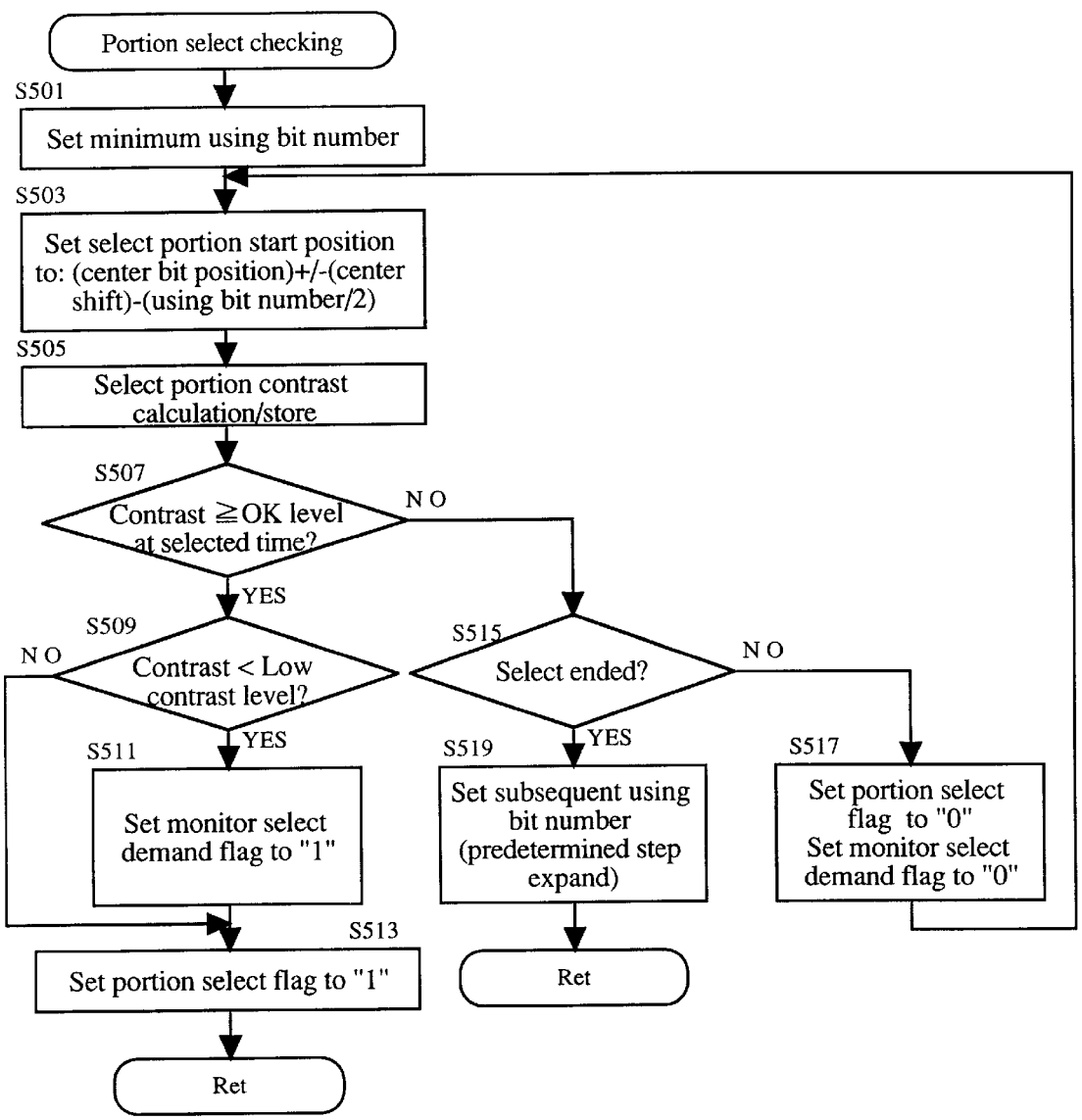
FIG. 16 is a flow chart of showing a focus detecting portion select checking operation in an automatic focusing operation of an auto-level according to the present invention; and, FIG. 17 is a flow chart showing an integral start operation in an automatic focusing operation of an auto-level according to the present invention.

The portion select operation at steps S423 and S431 is discussed below with reference to the flow chart shown in FIG. 16. The portion select operation is performed by focusing in regard to the focus detecting portion, selected as the narrowest focus detecting portion, among the central focal portion detecting portions Z1 through Z4 with the contrast being not less than the second predetermined value. If contrast less than the second predetermined value is obtained among the central focus detecting portions Z1 through Z4, the focusing is performed by using the maximum focus detecting portion Z.

When control enters the portion select operation (FIG. 16), the smallest usable amount of bit numbers, namely, the number of pixels (photometric tranceducers or light receiving elements) corresponding to the minimum focus detecting portion is set at step S501. Then the start position of the select portion is set at step S503. In such operations, the setting of the bit number of the pixels at the center of the focus detecting portions used for focus detection is performed, and in regard to the bit numbers S and N, which are positioned when the above-mentioned bit number is positioned at the center, thereof at each horizontal end of the above-mentioned bit number. According to an embodiment of the present invention, it is possible to adjust (shift) the center of the focus detecting portions, and hence, when the center is adjusted, the bit number at the center can be adjusted as well.

The contrast calculation is executed, based on the formula 1, according to the AF sensor data of the selected focus detecting portion, then the result of calculation is stored in RAM (of the calculation/control circuit 23) at step S505.

Whether the calculated contrast is greater than or equal to the OK level at the selected time (the second predetermined value) is checked at step S507, and if the calculated contrast is not less than the OK level, whether the contrast is less than the low contrast level is checked at step S509. If the contrast is not less than the low contrast level the portion select flag is set to "1", and control is returned (steps S509, S513). If the contrast is less than the low contrast level, the monitor select demand flag is set to "1", the portion select flag is set to "1", and control is returned (steps S509, S511, 513), so that the integration time corresponding to the selected portion is set and consequently the accuracy may improve. The low contrast level is more than the OK level during selection.

In any case when control is returned, the defocus amount is calculated based on the AF sensor data of the selected focus detecting portion, which actuates the focusing lens group 12 to be driven. When the monitor select demand flag is set to "1", the integration time corresponding to the selected portion is set and consequently accuracy may improve. The low contrast level is more than the OK level during selection.

In any case when control is returned, the defocus amount is calculated based on the AF sensor data of the selected focus detecting portion, which actuates the focusing lens group 12 to be driven. When the monitor select demand flag is set to "1", the integration time is controlled by the selected monitor sensor M2 during reintegration, so that the integration is executed at a more appropriate integration time.

When the contrast is judged as being less than the OK level at the selected time during the contrast check at step S507, since it is impossible to obtain the accurate defocus amount in such a portion, the focus detecting portion expand operation starting from step S515 is executed. Whether the selection ends, namely, whether the contrast check is performed in regard to the focus detecting portion Z4, is checked at step S515. When the contrast check is performed in regard to the focus detecting portions (focus detecting areas) Z1 through Z3, the bit number used for the subsequent focus detecting portion is set, namely, the focus detecting portion to be used is expanded by one portion, then control returns to step S503 (steps S515, S517, S503). If the contrast of the expanded portion is not less than the OK level at the selected time, control proceeds to step S503 from S517, and if the contrast of the expanded portion is less than the OK level at the selected time, control is returned to step S515 from S507.

When the contrast does not reach the OK level at the selected time despite that the portion used is expanded to the focus detecting portion Z4, the portion select flag and the monitor select demand flag are set to "0", and control is returned (steps S515, S519). In this case, the defocus amount is calculated by using the overall focus detecting portion Z.

Figure 17:
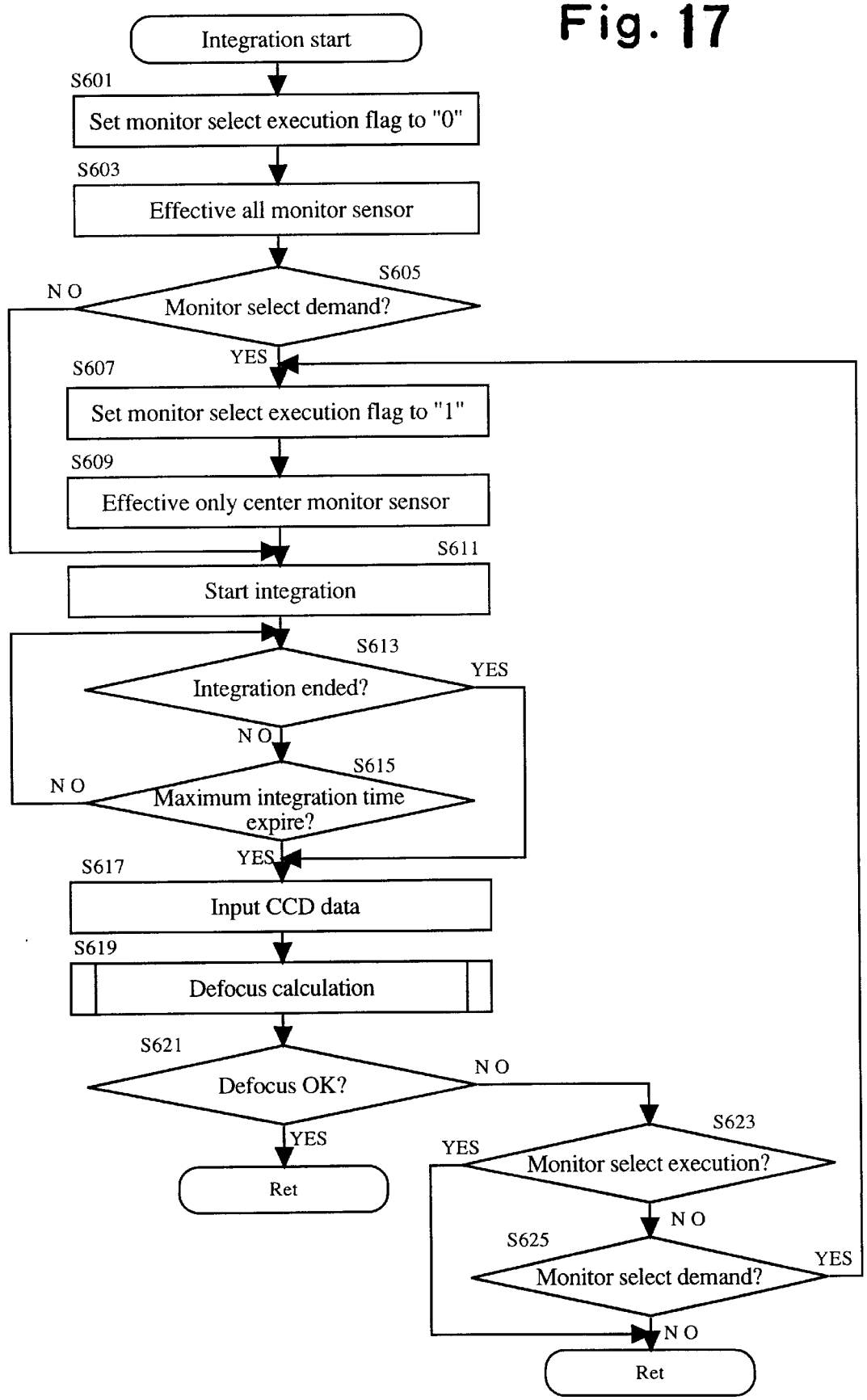

The integration start operation, which is executed at steps S307, S315, S345 and S383 in FIG. 12, is discussed below with reference to the flow chart shown in FIG. 17. The integration start operation executes, when the monitor select demand flag is not set to "1", the integration operation of the AF sensor 21 by setting all the monitor sensors as effective, and also executes, when the monitor select demand flag is set to "1", the integration operation of the AF sensor 21 by setting only the central monitor sensor M2 as effective. When the focus detecting portion is not selected, the defocus amount is calculated by using the AF sensor data of the overall focus detecting portion, and when the focus detecting portion is selected, the defocus amount is calculated by using the AF sensor data of the selected focus detecting portion, which is one of the most important features of the present invention.

When control enters the integration start operation, the monitor select execution flag is firstly set to "0", and all the monitor sensors become effective (steps S601, S603).

If the monitor select demand flag is not set to "1", the integration starts at once (steps S605, S611). If the monitor select demand flag is set to "1", the monitor select execution flag is set to "1", then only the central monitor sensor M2 becomes effective, and the integration starts (steps S605, S607, S609, S611).

The integration ends when output of the effective monitor sensor drops below the AGC level or when the maximum integration time expires. Then the CCD data (AF sensor data) is input and the defocus calculation is executed (steps S611, S613, S615, S617, S619).

If the calculated defocus amount is effective, control is returned at once (step S621). If no effective defocus amount is obtained, whether the monitor select execution flag is set to "1" is checked. As long as the monitor select demand flag is not set to "1", regardless of the setting of the monitor select execution flag to "1", control is returned at once (steps S621, S623, S625).

When the monitor select execution flag is set to "0", and when the monitor select demand flag is set to "1", control is returned to step S607 in order to execute the integration operation using the central monitor sensor M2, the input of the CCD sensor data, and the defocus amount calculation operation (steps S607, S619).

The focus detecting portion is selected through the above-mentioned reexecution operation, and the integration is executed by using the monitor sensor corresponding to the selected focus detecting portion. Consequently, it is possible to obtain more appropriate AF sensor data.

In the above-mentioned embodiment, the CCD line sensor 21c is used as the focus detecting means. Alternatively, it is possible to use an MOS type of line sensor.

Although the above-mentioned embodiment is applied to an auto-level, the present invention can be equally applied to other surveying instruments, such as a transit, or a telescopic optical system such as a telescope or a binocular telescope, etc.

As may be understood from the foregoing, according to the present invention, a plurality of monitoring areas are positioned adjacent to the line sensor which receive object light of the object image formed by the telephotographic system, and a focus detecting device is provided which controls the light receiving time of the line sensor by all the monitoring areas, and which detects a focusing state based on the outputs from the respective light receiving elements. When no effective focusing state is detected by the focus detecting device, the light receiving time of the line sensor is controlled only by the monitoring areas at the most centered position thereof. Consequently, the most appropriate light receiving time of the line sensor is controlled in regard to the object image positioned at the center of the image formed on the telephotographic system, and it is possible to be accurately focused on the object image positioned at the center.

What is claimed is:

1. An automatic focusing apparatus for a surveying instrument, comprising:

a telephotogphic optical svstem for observing an object positioned a predetermined distance from the telephotographic optical system;

a line sensor comprising multiple light receiving elements which receive light of an image of the object formed by said surveying instrument;

a plurality of monitor sensors, positioned adjacent to said line sensor, which monitor a quantity of light received by said line sensor; and a focus detecting device which controls light receiving times of said light receiving elements in accordance with said monitor sensors, and detects a focusing state based on outputs of respective light receiving elements;

wherein said focus detecting device initially conducts a first contrast detection utilizing all of the light receiving elements, and subsequently conducts a second contrast detection if the first contrast detection detects an in-focus state, the second contrast detection being conducted with only a portion of the light receiving elements.

2. An automatic focusing apparatus for a surveying instrument according to claim 1, wherein said line sensor receives light of an object image at a portion of said line sensor corresponding to a focus detecting portion symmetrically extending from a center of a visual field of said telephotographic system, and said monitor sensor positioned at said center monitors a quantity of light in a portion symmetrically positioned about said center of said visual field.

3. An automatic focusing apparatus for a surveying instrument according to claim 2, wherein, when said focus detecting device controls said light receiving time of said line sensor by said monitor sensor positioned at said center, said focus detecting device detects a focusing state based on an output from the light receiving element corresponding to a center portion symmetrically extending from said center of said visual field.

4. An automatic focusing apparatus for a surveying instrument according to claim 1, said line sensor further comprising a pair of line sensors each of said pair of line sensors receiving luminous flux from a beam-splitting device, and said focus detecting device detects a defocus amount based on a phase difference of said light received by respective line sensors.

5. An automatic focusing apparatus for a surveying instrument according to claim 1, wherein said focus detecting device calculates a contrast of an object image in a center portion of said focus detecting device, said contrast being calculated based on an output of said line sensor, a light receiving time of each said line sensor being controlled by all of said monitor sensors.

6. An automatic focusing apparatus for a surveying instrument according to claim 5, wherein said focus detecting device controls and light receiving time of said line sensor by said monitor sensor in said center portion when said calculated contrast is less than a predetermined value.

7. An automatic focusing apparatus for a surveying instrument according to claim 1, in which the telephotographic optical system further comprises:
   an objective lens group;
   a focusing lens group;
   a focusing plate incorporating a reticle;
   an eyepiece lens group to observe said object image formed on said focusing plate; and
   a beam splitting optical system positioned between said focusing lens group and said focusing plate, wherein,
   said line sensor incorporating multiple light receiving elements is positioned horizontally along a light path split by said beam splitting optical system, said reticle being designated as a center, and
   said focus detecting device detects said focusing state based on said output from said light receiving elements within a focus detecting portion where said reticle is designated as said center.

8. An automatic focusing apparatus for a surveying instrument according to claim 7, in which the telephotographic optical system further comprises a focusing lens group driving device which drives said focusing lens group based on a focusing state detected by said focus detecting device.

9. An automatic focusing apparatus for a surveying instrument, comprising:
   a telephotographic optical system for observing an object positioned apredetermined distance from the surveying instrument;
   a focus detecting device comprising a line sensor having a plurality of light receiving elements on which an optical image is formed by the telephotographic optical system; and
   a controlling device for conducting multiple contrast detections for obtaining an in-focus state of the object, the multiple contrast detections comprising a first contrast detection conducted by utilizing all of the light receiving elements of the line sensor, and a second contrast detection conducted if an in-focus state is detected in the first contrast detection, the second contrast detection being conducted by utilizing a predetermined portion of the light receiving elements of the line sensor.

10. The automatic focusing apparatus of claim 9, in which the object comprises a surveying staff.

11. The automatic focusing apparatus of claim 9, in which the telephotographic optical system comprises:
   an objective lens group;
   a focusing lens group;
   a focusing plate having a reticle; and
   an eyepiece lens group for observing an object image formed on the focusing plate.

12. The automatic focusing apparatus of claim 11, in which the telephotographic optical system further comprises:
   a beam splitting optical system positioned between the focusing lens group and the focusing plate.

13. The automatic focusing apparatus of claim 11 in which the telephotographic optical system further comprises:
   a beam splitting optical system positioned between the focusing lens group and the focusing plate.

14. An automatic focusing apparatus for a surveying instrument, comprising:
   a telephotographic optical system for observing an object positioned a predetermined distance from the surveying instrument;
   a focus detecting device comprising a line sensor having a plurality of light receiving elements on which an optical image is formed by the telephotographic optical system, and a plurality of monitor sensors for controlling an integration time of electrical charges collected in the line sensor; and
   a controlling device for conducting a plurality of contrast detections of the focus detecting device to obtain an in-focus state of the object, the contrast detection comprising a first contrast detection conducted by utilizing all of the light receiving elements of the line sensor and all of the monitor sensors, and a second contrast detection conducted if an in-focus state is detected in the first contrast detection, the second contrast detection being conducted by utilizing only a predetermined portion of the light receiving elements of the line sensor,
   wherein, when a detected contrast is less than a predetermined value in the second contrast detection, fewer than all of the monitor sensor control the integration time.

15. The automatic focusing apparatus of claim 14, in which the object comprises a surveying staff.

16. The automatic focusing apparatus of claim 14, in which the line sensor and the monitor sensor are parallel to each other.

17. The automatic focusing apparatus of claim 14, in which the telephotographic optical system comprises:
   an objective lens group;
   a focusing lens group;
   a focusing plate having a reticle; and
   an eyepiece lens group for observing an object image formed on the focusing plate.

* * * * *